Jan. 26, 1932. J. MELLOR 1,842,942
METALLIC PACKING FOR RECIPROCATING OR ROTATING MEMBERS
Filed Aug. 21, 1924 2 Sheets-Sheet 1
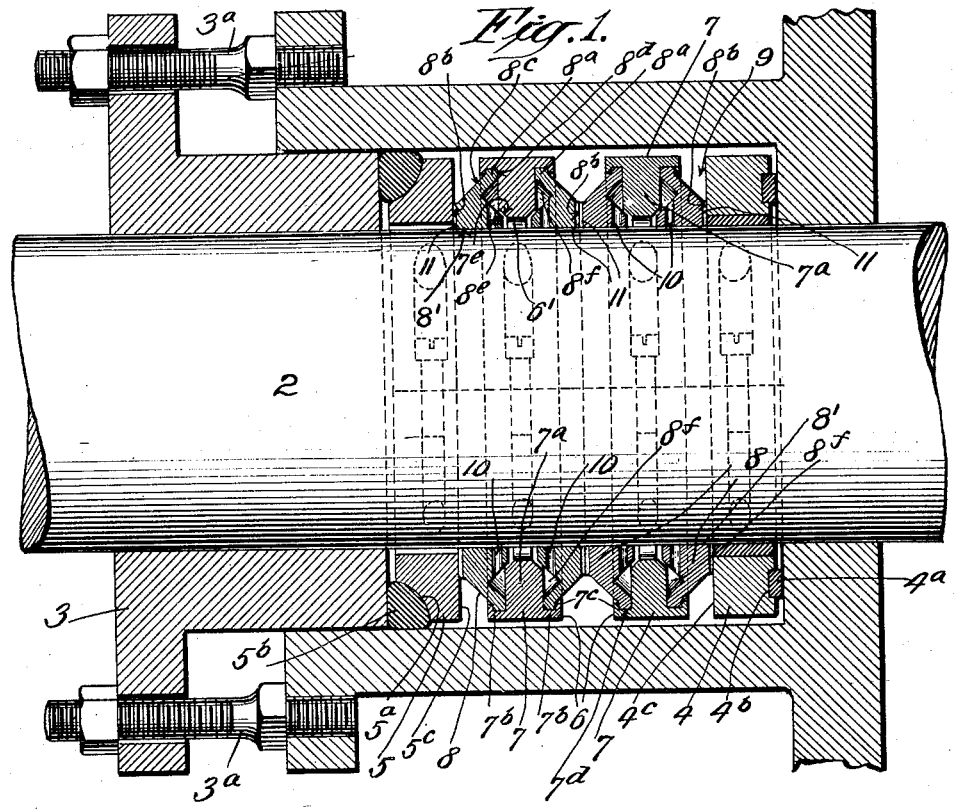
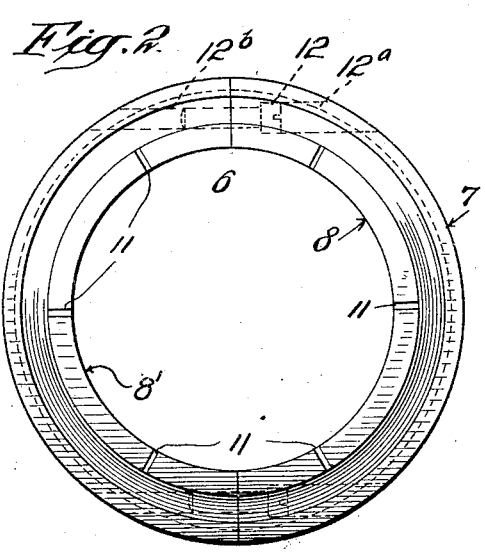
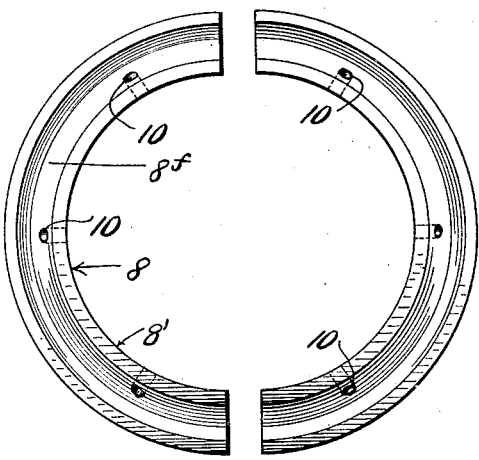
INVENTOR
John Mellor
BY Joseph F. O'Brien
ATTORNEY Jan. 26, 1932. J. MELLOR 1,842,942
METALLIC PACKING FOR RECIPROCATING OR ROTATING MEMBERS
Filed Aug. 21, 1924 2 Sheets-Sheet 2
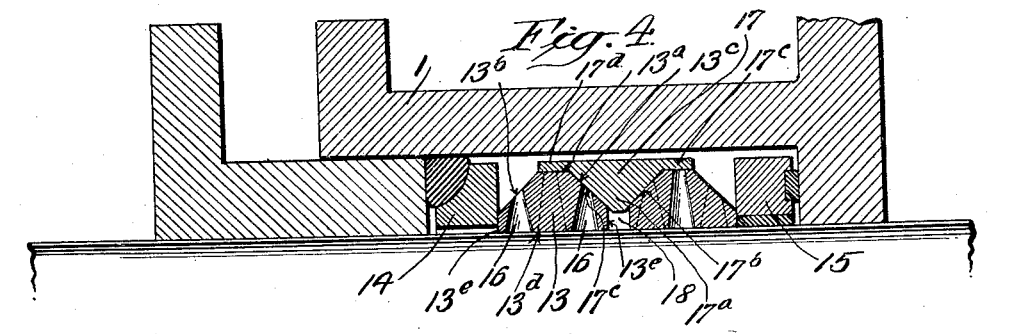
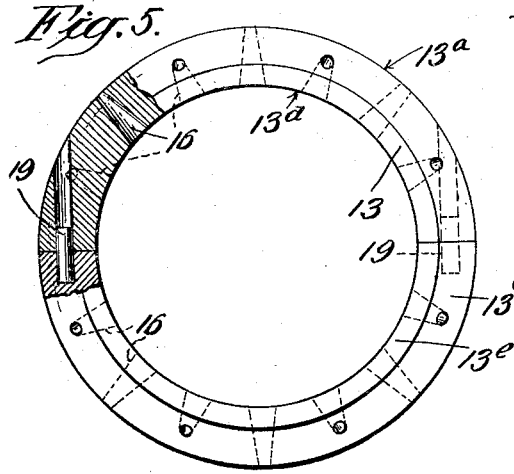
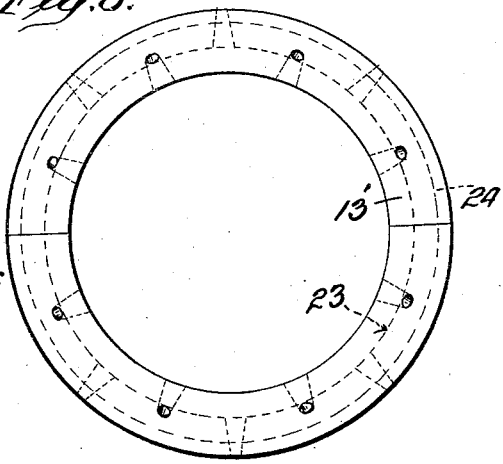
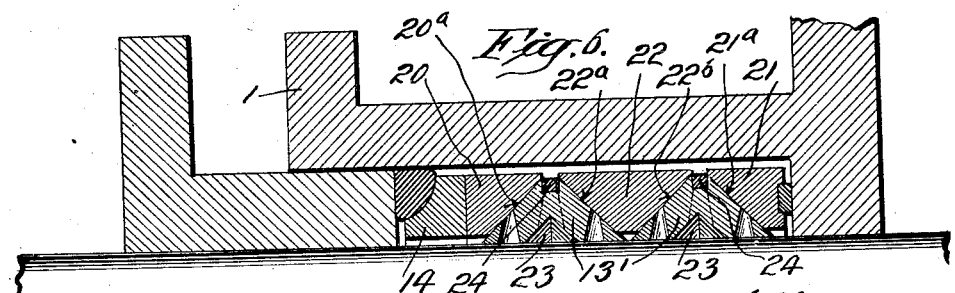
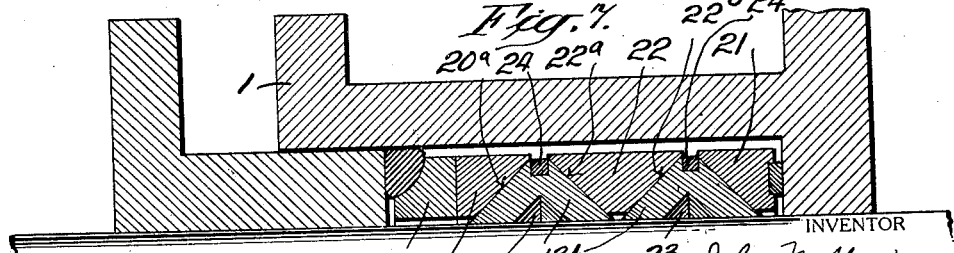

Patented Jan. 26, 1932

1,842,942

UNITED STATES PATENT OFFICE

JOHN MELLOR, OF BAY HEAD, NEW JERSEY

METALLIC PACKING FOR RECIPROCATING OR ROTATING MEMBERS

Application filed August 21, 1924. Serial No. 733,362.

This invention relates to improvements in metallic packing for reciprocating or rotating members.

Among the objects of my invention is to produce a metallic packing embodying a packing ring or rings preferably composed of segments secured together with inflexible or non-compensating joints and compressible by pressure from an external source to cause contraction of the ring-bore toward the rod, while preventing outward expansion and maintaining a substantially fixed predetermined peripheral dimension; to produce a metallic packing in which the packing rings will be gas or liquid tight on the rod notwithstanding the usual vibrating or eccentric movement within the box of the said rod due to poor workmanship, wear or unbalancing of the moving parts; to maintain the packing rings free and clear of the box at all points and to allow adjustment while preventing the packing from producing any binding or bearing effect between the rod and the box and thus making a bearing of the stuffing box; to provide abutment or end rings maintained free from the rod but having tight joints with the inner surface of the stuffing box, and also having a sliding contact and tight joint with the packing rings.

Another object of my invention is to provide a packing ring with means which will afford a greater degree of compressibility or collapsibility in a packing ring of a given composition and thus to enable materials or compositions of greater relative rigidity to be employed than would otherwise be possible, and at the same time to provide reservoirs and slots for lubricating material.

Another object of my invention is to provide in a metallic packing, abutment rings for forming tight joints with the stuffing box at opposite ends thereof and also having sliding surfaces for the packing rings, in combination with a compressible packing ring or rings adapted to form tight joints with the rod and with said sliding surfaces of the abutment rings, and a rigid housing ring or rings for guiding the movement during compression of the packing rings and in the preferred embodiment of my invention binding together two packing members to produce a single unitary ring having packing and housing or guiding members.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a longitudinal section of a packing embodying my invention;

Fig. 2 is a side elevation of a unitary ring composed of two packing members and a housing ring each composed of two semi-circular segments secured together;

Fig. 3 is a view of the inside surface of one of the packing members of the unitary ring shown in Figs. 1 and 2 before assembly in the housing ring;

Fig. 4 is a longitudinal fragmentary section of a modified form of metallic packing embodying my invention;

Fig. 5 is a side elevation of the modified form of packing ring shown in Fig. 4;

Figs. 6 and 7 are fragmentary longitudinal sections of metallic packings embodying my invention; and Fig. 8 is a side elevation of the modified form of packing ring shown in section in Fig. 6.

Referring now to these drawings, it will be noted that in all the forms of my metallic packing illustrated, I have employed abutment rings which have tight joints with the stuffing box, and packing ring or rings capable of being compressible to maintain a tight joint or joints between the bore or inner annular surface thereof and the rod on the one hand and with said abutment rings on the other, and furthermore that the packing ring or rings have inclined or conical sides which, being longer than the perpendicular distance between the inner annular surface and the top or apex will, upon compression from opposite sides cause a contraction toward or on the rod of the inner annular surface or bore, provided that the outer peripheral surface is held against expansion; that if an annular groove or other space be provided in the said inner annular surface of the ring such compression will serve to close up this space or cause the edges or walls of the groove to approach each other, and furthermore that I have provided means for holding the packing rings against outward expansion.

Referring now more particular to Figs. 1, 2 and 3 of these drawings, which constitute a preferred embodiment of my invention, 1 indicates a stuffing box of usual construction, with a rod or other rotating or reciprocating member 2 in place therein and packed with a compressible metallic packing embodying my invention, the pressure being applied from an outside source and preferably, as shown, being applied by the gland 3 and bolts $3^a$ which are mounted on the flange $1^a$ of the stuffing box 1.

In the said preferred form shown in said Figs. 1 to 3 my metallic packing comprises two abutment or end rings 4 and 5, the ring 4 being a bottom ring and the ring 5 being a top ring. Both of these rings 4 and 5 have tight joints with the stuffing box and are preferably maintained free of the rod 2. As illustrated, the bottom ring 4 is provided with a gasket $4^a$ seated in a countersink $4^b$ in the side surface thereof, said gasket being adapted to abut or press against the bottom of the stuffing box, to compensate for any unevenness thereof and to form a tight joint therewith while, as aforesaid, being relatively free from but moving with said rod. The ring 5 is provided with a groove $5^a$ and has a tight sealed joint by means of the sealing ring $5^b$ with the annular inner surface of the stuffing box and the gland 3.

The said abutment rings 4 and 5 are provided with opposite radial flat surfaces $4^c$ and $5^c$ between which are inserted packing rings 6, which are adapted upon compression to form a gas or liquid tight joint with the rod or member 2 and to have a vibratory or eccentric movement therewith within the stuffing box 1. I am enabled to allow this vibratory or eccentric movement of the rod and packing rings, while maintaining the packing rings in a gas and liquid tight condition on the said rod by providing for a sliding movement between the radial surfaces $4^c$—$5^c$ and the abutting side surfaces of the packing rings 6, and in the said preferred embodiment the packing rings 6, as hereinafter more particularly specified, are provided with radial side surfaces, two of which, at opposite ends, abut against and slide on said radial surfaces $4^c$—$5^c$ of the abutment rings 4 and 5.

In the preferred embodiment of my invention, two packing rings 6 are so inserted between such surfaces and each of such rings comprises a single unitary ring comprising a housing or guiding member 7 composed of relatively rigid material and preferably of cast iron or bronze and two oppositely disposed packing members 8 preferably composed of Babbitt or white metal. In the said preferred form illustrated, the housing or guiding member is composed of relatively rigid material and is T-shaped in cross-section, so as to provide a body portion $7^a$, outwardly and oppositely extending flanges $7^b$ and radial return flanges $7^c$ which form between themselves and the body portion retaining grooves $7^d$ within which the outer peripheries of the oppositely-disposed packing members 8 are fastened to hold the said rings against outward expansion and to retain the same to produce a unitary structure. In said preferred embodiment, each packing ring has at its outer periphery a contracted portion having a flat top $8^a$ which is fitted and secured within the grooves $7^d$ of the housing 7. Two of such unitary rings are shown and the packing members 8 have the radial straight sides $8^b$, two of which as hereinabove specified, abut against and slide on the surfaces $4^c$ and $5^c$ of the abutment rings. When two rings are thus employed the other two radial surfaces of said rings abut against each other. Each of such packing members is provided with conical sides $8^c$ inclining upwardly from the straight radial side $8^b$ to the flat top or apex $8^a$, while an inner side $8^d$ abuts against the side of the body $7^a$ and has a bevelled extension portion projecting beneath the same. Said body portion $7^a$ is preferably provided with bevelled conical or inclined edges $7^e$ for the purpose of guiding the bevelled extension $8^e$ to cause contraction of the annular bore or rod-contacting surface 8' and force the same into contact with the rod. The inner walls $8^d$ of said packing members are preferably grooved at $8^f$ to increase the compressibility of the packing members and to enable the extension $8^e$ to have greater inreach without any binding action beneath the housing member and to enable the bevelled edge of the body portion $7^a$ to guide the packing member toward and into contact with the rod. The lower wall of the groove $8^f$ forms the bevelled, conical or inclined surface of the inward extension $8^e$ and the angularity of this conical or inclined surface is such as to prevent a binding or wedging of the extension beneath the housing member and at the same time cause the guiding of such extension during compression by the conical, inclined or bevelled edges $7^e$ of the body portion $7^a$. The increasing of compressibility by the employment of the grooves $8^f$ increases the adjustability of the metallic packing, it being understood that a suitable adjusting space 6' between the oppositely-disposed packing members 8 is provided beneath the body portion $7^a$ of the housing member 7 and that the inclination of the outer sides provides an adjusting space 9 at opposite outer sides of said packing members and between an abutment ring and a housing member 7 or between two housing members.

The effect of this construction is that when pressure is applied the two packing members 8 of the unitary ring 6 will be compressed and forced toward each other beneath and within the housing ring, thus being capable of adjustment to compensate for wear and to produce a gas tight or liquid tight joint with the rod. It will be seen that, in such adjusting movement, the body of the packing members 8 will swing about the confined top or peripheral portions 8ª which will prevent any outward expansion while the body will be pressed toward and into contact with the rod. The space 6' in combination with the groove 8ᶠ and the communicating channel or space between the conical or bevelled edge 7ᶜ and the conical or bevelled extension 8ᶜ of the packing member forms a compressible reservoir which is filled with lubricant that will be squeezed out to lubricate the rod when pressure is applied on the packing through the gland. The said grooves and spaces between the packing members and the body portions 7ª act as reservoirs for lubricant during life of the packing even though at intervals the initial lubricant may disappear due to the drag of a new rod.

In order to enable packing members of a given degree of rigidity to be more readily compressible and furthermore to enable the use in packing members of a composition of greater rigidity than might otherwise be employed, I preferably provide in each of the rings a series of holes 10, which in the forms shown extend radially through the ring from the surface of the inner groove 8ᶠ to the annular bore or rod-contacting surface 8'. These holes not only cause the material of the ring to be more readily compressible or collapsible but also initially and before the same are closed by pressure, provide additional lubricating channels for the more uniform distribution of lubricating material on the rod and act as conduits for lubricant from the groove 8ᶠ to the rod. I also preferably provide lubricating channels from the exterior of the rings to the rod, and, as shown, provide in each of the radial side walls of the members 8 grooves 11. These grooves also assist in making the packing ring members more compressible.

In the said preferred form of my invention the housing members 7 are for facility of installation, preferably formed in two semi-circular segments and the packing members 8 are similarly formed in two semi-circular segments, and in the unitary ring structure are all connected together by bolts 12 inserted in opposite registering bores 12ª—12ᵇ in the housing ring. While, as aforesaid, the housing and packing rings are preferably made in two sections bolted together for ease of installation, it is noted that the slightest initial pressure from the exterior source causes the joints of the sides of the packing rings to press firmly together coincident with contracting movement of said sides, thus immediately producing the effect of a continuous or integral packing ring.

It will be noted that the packing rings are entirely free from the housing and are capable of movement within the housing on the surfaces 4ᶜ and 5ᶜ of the abutment rings 4 and 5 respectively, so as to enable the packing ring to maintain a position concentric with the rod and to form a gas and liquid tight joint therewith and in common with said rod to have a vibratory or eccentric movement within the box, while the abutment rings combined with the sealing rings seated therein enable tight joints to be obtained with the stuffing box at the rear and front ends thereof. I have thus provided a metallic packing having a gas or liquid tight joint between the reciprocating or rotating member and the stuffing box which reduces friction to the minimum, allows freedom of the rod or member in its vibratory or eccentric movement commonly found in machinery due to poor workmanship, wear or unbalancing of the moving parts, and furthermore that my packing allows for a maximum of adjustment and compression from an exterior source without making a bearing of the stuffing box and packing, and thus avoids the binding of the member within the limits of the box, and also avoids friction caused by uneven pressure of adjustment.

In Figs. 4 and 5 I have shown a modified form of my invention in which two packing rings 13 are inserted between abutment rings 14 and 15 respectively in all respects similar to the abutment rings shown in Fig. 1. The packing rings in this modified form each comprises a ring polygonal in cross-section having a substantially flat top or periphery 13ª, two conical or inclined sides 13ᵇ and 13ᶜ, respectivey, diverging from said flat top 13ª and meeting between the flat top 13ª and the rod-contacting surface 13ᵈ with radial sides 13ᵉ respectively. Each of these packing rings is preferably composed of a packing material which is relatively rigid and the rings are preferably drilled to provide conical holes 16 which tend to make the relatively rigid material of the ring capable of being compressed or crushed upon the application of power from an external source, as hereinabove fully explained. These holes 16 act as distributing reservoirs for lubricant which will, upon the crushing of the material for the purpose of procuring a tight joint with the rod, cause a squeezing of the oil out of the same on to the rod.

In the modified packing shown, two of such rings 13 are spaced from each other by a housing ring 17 which is formed of rigid material and is, as illustrated, provided with a body portion 17ª triangular in cross-section having conical or inclined sides 17ᵇ—17ᶜ converging toward the rod. Said converging conical or inclined sides abut, as shown, against the oppositely disposed conical or inclined sides of the two packing rings 13 and separate them to provide an adjusting space 18 therebetween, and oppositely disposed outwardly extending flanges 17ᵈ—17ᵉ rest upon the flat top portions 13ª to more completely house the two rings therein and to prevent outward expansion during the compression movement thereof. In a packing of this construction the body of the rings 13 are upon compression guided by the conical or inclined sides 17ᵇ and 17ᶜ to contract their bores and to form an air tight and liquid tight joint with the rod and also said packing rings with the housing ring are adapted to have a vibratory or eccentric movement with the rod within the stuffing box 1, two of the radial sides 13ᶜ abutting against the abutment members 14 and 15 and having a radial sliding movement thereon to allow for such vibratory or eccentric movement of the rod and packing rings. The housing member thus serves to maintain a fixed peripheral dimension for the packing rings, to maintain said rings free and clear of the annular wall of said stuffing box and to so guide the same as to cause a contraction of the bore on the rod. The packing rings in this case are, for facility of installation preferably made in two semi-circular segments and are connected together by pins or dowels 19.

In the construction illustrated in Figs. 6 and 8 packing rings of substantially similar conformation to those shown in Figs. 4 and 5 are employed, except that the radial sides are omitted and a pressure is applied against the conical or inclined sides by providing abutment members 20—21 with conical or inclined sides 20ª—21ª respectively, and also utilizing a housing ring 22 having conical or inclined sides 22ª—22ᵇ abutting against opposite conical or inclined sides of the two rings within the packing. The effect of this construction is that the housing ring 22 and abutment rings 20—21 serve to prevent outward expansion and thus to preserve a predetermined peripheral dimension for the ring and at the same time guide the conical or inclined sides of the ring toward each other and downwardly on to the rod to contract the bore to cause a gas and liquid tight joint with said rod. In order to provide increased compressibility, I provide a centrally located annular groove 23 in each of the packing rings.

The packing construction shown in Fig. 7 is in all respects substantially similar to that shown in Fig. 6 except that the conical bores are omitted. It will be seen in these constructions that the packing rings are, upon compression, capable of forming a liquid and gas tight joint with the rod while at the same time having a vibratory or eccentric movement therewith within the stuffing box. In Figs. 6 and 7 this vibratory movement is afforded partly by the sliding of the ring 20 on the abutment ring 14 and the sliding of the abutment rings 21 on the bottom surface of the stuffing box. In all cases tight joints are maintained first in the stuffing box, second between the packing rings and the rod, and thirdly between packing rings and the member or members which forms the tight joint with the stuffing box, though in some cases one of the members which forms a tight joint with the stuffing box may have the double function of partially housing the packing rings, as shown in Figs. 6 and 7, and in other cases the resilience of the sealing ring may be utilized to enable the packing ring to vibrate or have eccentric movement on the rod while still maintaining a tight joint with the stuffing box.

Having described my invention, I claim:—

1. A unitary packing ring for reciprocating or rotating members embodying, in combination, a rigid housing substantially T-shaped in cross-section and double oppositely-disposed compressible packing ring elements having a circumferential anchoring connection at their peripheries to the oppositely outwardly extending flanges of the T-shaped body portion and also having conical sides adapted under pressure to be guided by the housing to cause the material of the ring to be deflected toward the bore to increase the normal contraction thereof.

2. A unitary packing ring for reciprocating or rotating members embodying, in combination, a rigid housing substantially T-shaped in cross-section and having a body portion provided with bevelled edges at opposite sides and double oppositely disposed packing ring elements composed of compressible material, each having a substantially flat top, a conical and radial face at one side and a groove at the other side having conical walls, the said peripheries being fastened to the oppositely disposed flanges and having one of the conical walls of the groove extending beneath the bevelled edges thereof to cause the guiding of the material of the packing ring toward the bore upon pressure.

3. A packing for members rotating or reciprocating within stuffing boxes embodying, in combination, a rigid annular holding element of less diameter than the stuffing box to be packed, an annular packing ring element having flat opposite radial sides, of less height than the thickness of the ring, extending from the inner annular surface outwardly, and inclined sides connecting said flat radial sides with the periphery of the ring to leave an open space thereabove, said ring being compressible toward the middle of the ring by pressure exerted at the opposite sides thereof and provided at its periphery with an anchoring bearing on the said holding element arranged to prevent radial expansion of said packing ring, said packing ring having a body, the major portion of which is arranged within said holding element, and elements having flat radial surfaces engageable with the radial sides of said compressible packing ring.

4. A packing for members rotating or reciprocating within stuffing boxes embodying, in combination, a rigid annular holding element of less diameter than the stuffing box to be packed, an annular packing ring element having flat opposite radial sides, of less height than the thickness of the ring, extending from the inner annular surfaces outwardly and inclined sides connecting said flat radial sides with the periphery of the ring to leave an open space thereabove, said ring being compressible toward the middle of the ring by pressure exerted at the opposite sides thereof and provided at its periphery with an anchoring bearing on the said holding element arranged to prevent radial expansion of said packing ring, said packing ring having a body, the major portion of which is arranged within said holding element, and abutment ring members having flat radial sides abutting against the flat radial sides of the said packing ring.

In witness whereof, I have signed my name to the foregoing specification.

JOHN MELLOR.